(12) United States Patent
Drefahl

(10) Patent No.: US 6,682,682 B2
(45) Date of Patent: Jan. 27, 2004

(54) METHOD FOR MANUFACTURING A MOTOR VEHICLE STEERING WHEEL

(75) Inventor: Klaus Drefahl, Hanau (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/340,320

(22) Filed: Jan. 10, 2003

(65) Prior Publication Data

US 2003/0101842 A1 Jun. 5, 2003

Related U.S. Application Data

(62) Division of application No. 09/646,580, filed as application No. PCT/EP00/00584 on Jan. 26, 2000, now Pat. No. 6,561,059.

(30) Foreign Application Priority Data

Jan. 27, 1999 (DE) .......................... 299 01 404

(51) Int. Cl.[7] .............................. B29C 45/14
(52) U.S. Cl. ................ 264/263; 264/275; 264/279; 74/552
(58) Field of Search ................ 264/263, 275, 264/279; 74/552

(56) References Cited

U.S. PATENT DOCUMENTS

| | | |
|---|---|---|
| 1,847,414 A | 3/1932 | Smith |
| 3,394,615 A | 7/1968 | Brueder |
| 4,386,538 A | 6/1983 | Van Wicklin, Jr. |
| 4,419,908 A | 12/1983 | Reikowski |
| 4,627,307 A | 12/1986 | Yamazawa et al. |
| 4,635,500 A | 1/1987 | Overcashier et al. |
| 4,749,422 A | 6/1988 | Kondo et al. |
| 4,875,387 A | 10/1989 | Henigue |
| 4,909,097 A | 3/1990 | Henigue |
| 4,975,235 A | 12/1990 | Henigue |

FOREIGN PATENT DOCUMENTS

| | | | |
|---|---|---|---|
| JP | 59109460 A | * | 6/1984 |
| WO | WO 99/41131 | | 9/1999 |
| WO | WO 00/44604 | | 8/2000 |

* cited by examiner

Primary Examiner—Edmund H. Lee
(74) Attorney, Agent, or Firm—Tarolli, Sundheim, Covell & Tummino L.L.P.

(57) ABSTRACT

The steering wheel for motor vehicles has a hub, a steering wheel rim and a plurality of spokes connecting the steering wheel rim with the hub. The hub comprises a hub core for fastening to a steering shaft and a base body which surrounds the hub core and is made of a fiber-reinforced plastic material. The spokes are integrally and continuously molded with the base body of the hub from a fiber-reinforced plastic material. The steering wheel rim is integrally and continuously molded with the spokes from a fiber-reinforced plastic material. In this arrangement, the base body together with the spokes and the steering wheel rim forms a self-supporting shaped body.

4 Claims, 1 Drawing Sheet

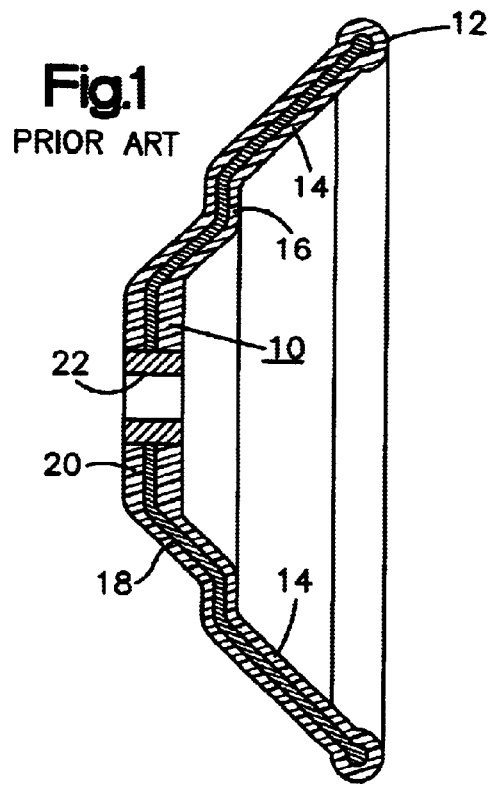
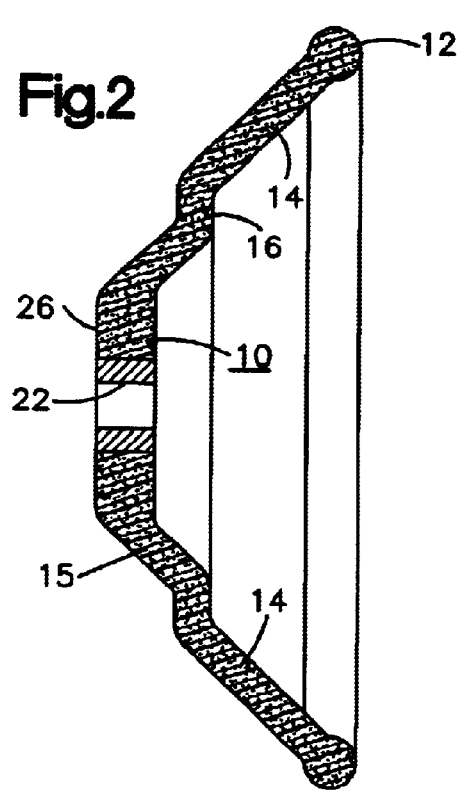
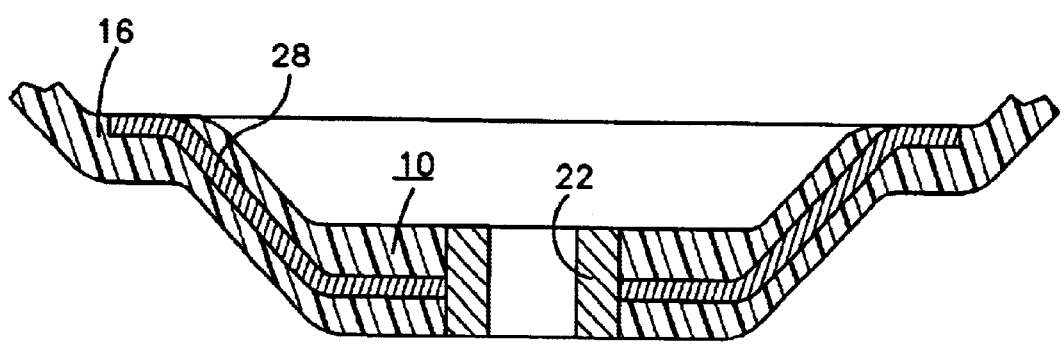
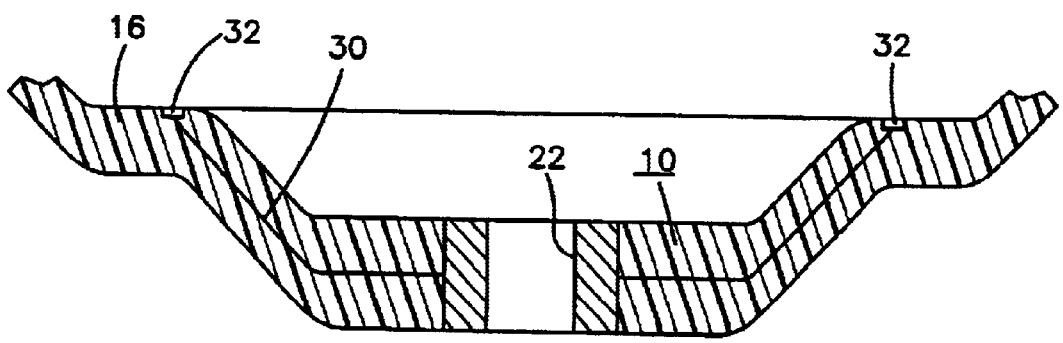

METHOD FOR MANUFACTURING A MOTOR VEHICLE STEERING WHEEL

This application is a divisional of U.S. application Ser. No. 09/646, 580 filed Sep. 19, 2000, now U.S. Pat. No. 6,561,059, which is a 391 of PCT/EP00/00584, filed Jan. 26, 2000.

FIELD OF THE INVENTION

The invention relates to a steering wheel for motor vehicles and a method for its manufacture.

BACKGROUND OF THE INVENTION

In conventional steering wheels, the generally metallic skeleton comprises the hub region, the spokes and the steering wheel rim. In the hub region, high material strengths are necessary in order to be able to transfer all the forces occurring in the intended use of the steering wheel in as space-saving a manner as possible onto the steering column which is fastened in the vehicle body. Also the spoke and rim regions of the steering wheel skeleton must be designed primarily for the steering forces which are to be transferred. Furthermore, these regions of the steering wheel skeleton have already been designed for some time such that in the case of an impact of the driver of the vehicle caused by an accident, they can absorb a high proportion of the impact energy by deformation and hence reduce the risk of injury.

Steering wheel skeletons are either constructed from metallic semifinished parts which are preformed in a machining or non-machining manner and which are connected with each other by means of welding or soldering processes, or by a casting technique and then are generally produced in one piece from a light metal alloy. In so doing, of course one strives to meet all mechanical requirements with as small an expenditure of material as possible, the manufacturing methods by casting technique being in fact generally more expensive, but offering substantially more possibilities in fashioning compared with the manufacture from semifinished shaped parts.

A further essential aspect in the design of steering wheel skeletons results from the necessity of fastening the airbag module, which in all modern motor vehicles is arranged as standard in the steering wheel. With the explosion-like unfolding of the airbag, quite considerable reaction forces arise for a short period of time, which have to be transferred reliably from the airbag mount to the steering wheel skeleton.

SUMMARY OF THE INVENTION

By the invention a steering wheel for motor vehicles is made available which fully or almost completely does away with the steering wheel skeleton that would increase the manufacturing expense.

The steering wheel according to the invention has a hub, a steering wheel rim and a plurality of spokes connecting the steering wheel rim with the hub. The hub comprises a hub core for fastening to a steering shaft and a base body which surrounds the hub core and is made of a fiber-reinforced plastic material. The spokes are integrally and continuously molded with the base body of the hub from a fiber-reinforced plastic material. The steering wheel rim is integrally and continuously molded with the spokes from a fiber-reinforced plastic material. The base body together with the spokes and the steering wheel rim forms a self-supporting shaped body.

Suitable plastic materials are the same as have been used hitherto for encasing the steering wheel skeletons. These plastic materials are in particular polyurethane, polyamide, and polypropylene. Preferably, these plastic materials are also foamed, just as in the casings usual hitherto. It has been found that by adding reinforcing fibers to the plastic mass there can be achieved such a mechanical strength of the steering wheel body that the use of a steering wheel skeleton is no longer necessary. It is possibly in the region of the hub of the steering wheel that the use of a reinforcing means is expedient which at the same time serves then for supporting and mounting a gas bag module.

In the preferred embodiment there is achieved a particularly high strength and solidity of the steering wheel in that the shaped body in the region near its outer surface is reinforced by fibers which are arranged predominantly stretched and parallel to the outer surface; the shaped body can be reinforced internally by irregularly or randomly distributed fibers, the fibers, however, should be present predominantly in a stretched condition.

The invention further provides a method for the manufacture of the steering wheel. The exceptional feature of the method is that the hub core of the steering wheel is placed into a mold and a mass, consisting of plastic material and reinforcing fibers, is introduced into the mold. The mass is introduced without pressure into an open form tool part preferably by means of a program-controlled and movable injection head. In the process, the reinforcing fibers are added to the injected mass in the course of injection molding. When injection of the mass is completed and prior to foaming up the latter, the mold is closed. The metering of the reinforcing fibers is preferably done in the course of injecting the mass, corresponding to the desired mechanical properties of the various regions of the steering wheel, and likewise preferably program-controlled.

By employing the method according to the invention it is achieved in a particularly advantageous manner that the reinforcing fibers are arranged in the region near the outer surface predominantly stretched and parallel to the outer surface, whilst in the interior of the shaped body they may also be arranged irregularly and randomly. The reinforcing fibers, however, are predominantly present in a stretched condition. The reinforcing fibers constitute a shell of the shaped body, which allows to be loaded with high tensile and compressive forces. Due to this nature of the shaped body, it has the desired mechanical properties, in particular an appropriate flexural strength and the plastic deformability which is necessary for energy dissipation in the case of an impact.

BRIEF DESCRIPTION OF THE DRAWINGS

Further features and advantages of the invention read from the following description of several embodiments and from the drawing to which reference is made and in which:

FIG. 1 shows schematically a radial section of a conventional steering wheel;

FIG. 2 shows a radial section of a steering wheel according to the invention;

FIG. 3 shows an enlarged partial section of a first design variant; and

FIG. 4 shows an enlarged partial section of a second design variant.

DETAILED DESCRIPTION OF THE INVENTION

The conventional steering wheel for motor vehicles, as shown in FIG. 1, has a hub 10, a steering wheel rim 12 and a plurality of spokes 14 connecting the steering wheel rim 12 with the hub 10. The hub 10 forms in the region of transition to the spokes 14 a shoulder 16 for the supporting and fastening of a gas bag module.

The conventional steering wheel shown in FIG. 1 consists of a metallic skeleton 18 and a casing 20 made of plastic material. The skeleton 18 extends from a hub core 22, in the shape of a bush, through the hub 10, the shoulder 16, the spokes 14 and up to the steering wheel rim 12. The casing 20 consists of a preferably foamed plastic material such as polyurethane.

FIG. 2 shows the embodiment of the steering wheel and according to the invention, in which the steering wheel skeleton is completely dispensed with. The hub 10 consists of a hub core 22 in the shape of a metal bush and a base body 26, the latter surrounding the hub core 22 and extending up to the shoulder 16. The base body 26 together with the spokes 14 and the steering wheel rim 12 constitutes a shaped body made of fiber-reinforced plastic material.

Manufacture of the steering wheel is preferably done by a special molding method in which the plasticized plastic mass is introduced without pressure into an open form tool. Introducing the plastic mass is effected by means of a movable injection nozzle, which is directed along the cavity of the tool part, in particular in a program-controlled manner. During the injection process, reinforcing fibers are added to the injected plastic mass. Mineral fibers such as glass fibers, carbon fibers, aramide fibers or metal fibers are of advantage; organic reinforcing fibers are also suitable.

Suitable plastic material are in particular polyurethane, polyamide, and polypropylene.

In the preferred embodiment of the method the plastic material is foamed.

On application of the method described, there results a steering wheel with a shaped body, in which the reinforcing fibers in the region near the outer surface are arranged predominantly stretched and parallel to the outer surface. In the interior of its cross-section, however, the shaped body has irregularly arranged and distributed reinforcing fibers. The shaped body has the mechanical properties, in particular its flexural strength, due to the reinforcing fibers being arranged in the region near its outer surface so as to be stretched and parallel to this surface, the fibers in this way being subjected to tensile and compressive stress.

In the embodiment shown in FIG. 3, the hub 10 is reinforced by a metallic reinforcing insert 28 which is connected with the bush-shaped hub core 22 and extends up to the region of the shoulder 16. The reinforcing insert 28 serves mainly for the supporting and mounting of a gas bag module. For this, the ends of the reinforcing insert 28 are configured in the region of the shoulder 16 as fastening elements, e.g. in the nature of nuts, which are flush with the surface of the shoulder 16.

In the embodiment shown in FIG. 4, the reinforcing insert is replaced by a mounting structure 30 which at its outer ends comprises in the region of the shoulder 16 fastening elements 32 such as nuts.

The reinforcing insert 28 in the embodiment according to FIG. 3 or the mounting structure 30 in the embodiment according to FIG. 4 is placed into the cavity of the form tool prior to introducing the plastic mass together with the hub core 22. The reinforcing insert 28 and the mounting structure 30, respectively, are embedded in the shaped body after introducing the plastic mass.

What is claimed is:

1. A method for manufacture of a steering wheel for motor vehicles comprising a hub, a steering wheel rim and a plurality of spokes connecting the steering wheel rim with the hub, the hub comprising a hub core for fastening to a steering shaft and a base body which surrounds the hub core and is made of a fiber-reinforced plastic material, the spokes extending from a region of transition between the base body of the hub and the spokes, the spokes being integrally and continuously molded with the base body from the fiber-reinforced plastic material, the steering wheel rim being integrally and continuously molded with the spokes from the fiber-reinforced plastic material the base body together with the spokes and the steering wheel rim forming a self-supporting shaped body, wherein at the region of transition, the base body of the hub forms a shoulder for supporting a gas bag module, and wherein fastening elements are embedded in the shaped body in the region of the shoulder, the fastening elements being connected with the hub core by a mounting structure embedded in the shaped body, the method comprising the steps of:

placing the hub core together with the mounting structure into a mold, injection molding a mass, consisting of plastic material, without pressure into the mold, adding reinforcing fibers to the injected mass during the step of injection molding, and closing the mold after injection of the mass.

2. The method according to claim 1, wherein the step of adding the reinforcing fibers includes varying the amount of fibers added during the step of injection molding the mass.

3. A method for the manufacture of a steering wheel for motor vehicles comprising a hub, a steering wheel rim and a plurality of spokes connecting the steering wheel rim with the hub, the hub comprising a hub core for fastening to a steering shaft and a base body which surrounds the hub core and is made of a fiber-reinforced plastic material, the spokes extending from a region of transition between the base body of the hub and the spokes, the spokes being integrally and continuously molded with the base body of the hub from a fiber-reinforced plastic material, the steering wheel rim being integrally and continuously molded with the spokes from the fiber-reinforced plastic material, the base body together with the spokes and the steering wheel rim forming a self-supporting shaped body, wherein at the region of transition, the base body of the hub forms a shoulder for supporting a gas bag module, the base body comprising a reinforcing insert extending from the hub core to the region of transition, the reinforcing insert having ends in the region of transition configured as fastening elements, the method comprising the steps of:

placing a hub core together with the reinforcing insert into a mold, injection molding a mass, consisting of plastic material, without pressure into the mold, adding reinforcing fibers to the injected mass during the step of injection molding, and closing the mold after injection of the mass.

4. The method according to claim 3, wherein the step of adding the reinforcing fibers includes varying the amount of fibers added during the step of injection molding the mass.

\* \* \* \* \*